United States Patent
Ikedaya et al.

(10) Patent No.: US 9,415,766 B2
(45) Date of Patent: Aug. 16, 2016

(54) REGENERATIVE CONTROL DEVICE OF VEHICLE

(71) Applicant: MITSUBISHI JIDOSHA KOGYO KABUSHIKI KAISHA, Tokyo (JP)

(72) Inventors: Hisakazu Ikedaya, Okazaki (JP); Shigetoshi Hirano, Toyoake (JP); Katsunori Ueda, Okazaki (JP); Kentaro Honda, Okazaki (JP); Tadayoshi Hirao, Okazaki (JP); Takahiro Oguma, Nagoya (JP); Takuya Sato, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/746,294

(22) Filed: Jun. 22, 2015

(65) Prior Publication Data

US 2015/0367835 A1 Dec. 24, 2015

(30) Foreign Application Priority Data

Jun. 23, 2014 (JP) .................. 2014-128245

(51) Int. Cl.
*B60L 9/00* (2006.01)
*B60W 10/26* (2006.01)
*B60W 10/06* (2006.01)
*B60W 10/08* (2006.01)

(52) U.S. Cl.
CPC ............. *B60W 10/26* (2013.01); *B60W 10/06* (2013.01); *B60W 10/08* (2013.01); *B60W 20/13* (2016.01); *B60W 2510/0676* (2013.01); *B60W 2510/244* (2013.01); *B60W 2710/0666* (2013.01); *B60W 2710/083* (2013.01); *Y10S 903/93* (2013.01)

(58) Field of Classification Search
USPC .......................................... 701/22
See application file for complete search history.

(56) References Cited

U.S. PATENT DOCUMENTS

| | | | | |
|---|---|---|---|---|
| 2007/0137909 A1* | 6/2007 | Zillmer | .................. | B60K 6/485 180/65.245 |
| 2011/0078999 A1* | 4/2011 | Gonze | .................. | F01N 3/2026 60/286 |
| 2011/0178665 A1* | 7/2011 | Yoshioka | .............. | B60W 10/06 701/22 |
| 2013/0069591 A1* | 3/2013 | Iyasu | .................... | H02J 7/1461 320/109 |
| 2013/0211650 A1* | 8/2013 | Tashiro | ................. | B60W 10/06 701/22 |
| 2015/0094893 A1* | 4/2015 | Hopkirk | ................. | F02D 29/02 701/22 |
| 2015/0105957 A1* | 4/2015 | Okamoto | .............. | B60W 10/30 701/22 |
| 2015/0260442 A1* | 9/2015 | Ragazzi | ................. | F25D 21/08 62/80 |

FOREIGN PATENT DOCUMENTS

| | | |
|---|---|---|
| JP | 2009-196404 A | 9/2009 |
| JP | 2012-6525 A | 1/2012 |

* cited by examiner

*Primary Examiner* — Hussein A. Elchanti
(74) *Attorney, Agent, or Firm* — Birch, Stewart, Kolasch & Birch, LLP

(57) ABSTRACT

A regenerative control device of a vehicle an engine; a first motor; a second motor performing regenerative power generation; a battery connected to the first and second motors; and a heating device heating using heat, includes: a determiner determining whether the heating device is in operation or not, and determining whether charging the battery is regulated or not; and a controller performing parallel firing control in which a driving force is given to the engine by the first motor while burning fuel in the engine, during the regenerative power generation when the heating device is in operation and charging the battery is regulated, and setting a target torque of the engine in the parallel firing control to be equal to or lower than a burning limit torque of the engine.

6 Claims, 3 Drawing Sheets

REGENERATIVE CONTROL DEVICE OF VEHICLE

CROSS-REFERENCE TO RELATED APPLICATION(S)

This application is based upon and claims the benefit of priority from prior Japanese patent application No. 2014-128245, filed on Jun. 23, 2014, the entire contents of which are incorporated herein by reference.

BACKGROUND

The present invention relates to a regenerative control device of a vehicle using an engine and a motor as driving sources.

In the related art, of hybrid vehicles each mounted with an engine and a traveling motor as driving sources of the vehicle, some hybrid vehicles have been sold in the following configuration. That is, a power generation function is added to the traveling motor while another motor generator than the traveling motor is linked with the engine so that the driving force of the engine can be connected to and disconnected from a power transmission path. That is, generation of a driving force and generation of electric power can be performed in each of the engine and the traveling motor. Such a hybrid vehicle in which a series system and a parallel system are combined can support various vehicle driving modes as compared with an existing driving system such as a simple series system or a simple parallel system. In the series/parallel combined hybrid vehicle, the engine and the traveling motor can be used separately or together in accordance with the traveling state of the vehicle.

The diversity of vehicle driving modes contributes not only to the power performance of the vehicle but also to improvement of energy efficiency in traveling. For example, when regenerative power generation is carried out in the traveling motor during travel, using the driving force of the engine, it is possible to charge a traveling battery or assist a braking force. Even during travel using the driving force of the traveling motor, the traveling battery can be charged with regenerative electric power generated at the time of deceleration, and a braking force can be given to wheels as if an engine brake were operated. Further, when the engine is operated at a rotation speed high in operation efficiency and the motor generator is driven by the engine, the traveling battery can be charged efficiently.

On the other hand, in the hybrid vehicle configured thus, the frequency with which the traveling battery is charged during travel is increased. It is therefore concerned that the battery may be overcharged. Particularly the recovery amount of regenerative electric power generated in the traveling motor affects the magnitude of a braking force in the vehicle. It is therefore desired that the vehicle can travel while recovering the regenerative electric power of the traveling motor in some method even when the traveling battery is almost fully charged.

To this end, there has been proposed a technique in which, of the regenerative electric power of the traveling motor, surplus electric power that is not used for charging the battery is consumed by an air conditioning system. For example, it can be considered that the surplus electric power is assigned for power consumption in a compressor, an air blower, etc. of the air conditioning system so as to improve the cooling capacity or the heating capacity. When such a method is used, it is possible to secure a braking force without overheating the battery, and it is also possible to intend to use electric power effectively (see JP-A-2009-196404).

In addition, there has been proposed a technique in which a motor generator linked with an engine is driven as an electric motor to forcibly rotate the engine that has been stopped. That is, the engine that has been separated from a power transmission path of a vehicle e is used as a rotational load of the motor generator so that electric power can be consumed by the motor generator. Due to such a control, it is possible to perform regenerative braking while regulating charging a traveling battery, so that drive feeling can be improved (see JP-A-2012-6525).

However, regenerative electric power of a vehicle increases and decreases in accordance with the traveling state of the vehicle. The regenerative electric power is not always generated periodically or regularly. As a result, when the regenerative electric power is consumed by an air conditioning system, fluctuation in air conditioning capacity may increase to make the air conditioning performance unstable. In addition, of the air conditioning system mounted on the vehicle, a heating device for heating the inside of a cabin often has a mechanism for generating hot air using heat generated. In an engine. However, heat is not generated when the engine is stopping or when the engine is being forcibly driven to rotate. It is therefore impossible to secure satisfactory heating performance even when the air conditioning system is operated.

Thus, in a related-art hybrid vehicle, there is a problem that it is difficult to make the regenerative braking performance based on recovery of regenerative electric power and the heating performance compatible.

SUMMARY

One of objects of the present invention is created in consideration of the aforementioned problem. That is, the object is to provide a regenerative control device of a vehicle capable of improving regenerative braking performance and heating performance simultaneously. In addition to the object, it can be positioned as another object of the invention to obtain operations and effects derived from respective configurations which will be described later, as long as the operations and effects cannot be obtained in the related art.

In order to achieve the above object, according to an aspect of the invention, there is provided a regenerative control device of a vehicle, die vehicle including: an on-vehicle engine; a first motor which is connected to the engine; a second motor which is configured to drive wheels and which is configured to perform regenerative power generation; a battery which is connected to the first motor and the second motor; and a heating device which is configured to heat using heat generated in the engine, the regenerative control, device comprising: a determiner which is configured to determine whether the heating device is in operation or not, and which is configured to determine whether charging the battery is regulated or not; and a controller which is configured to perform parallel firing control in which a driving force is given to the engine by the first motor while burning fuel in die engine, during the regenerative power generation when the heating device is in operation and charging the battery is regulated, the controller which is configured to set a target torque of the engine in the parallel firing control to be equal to or lower than a burning limit torque of the engine.

The controller may perform independent motoring control in which a driving force is given to the engine by the first motor without burning fuel in the engine during the regenerative power generation when the heating device is not in operation and charging the battery is regulated, and a total sum of a target torque of the first motor in the parallel motoring control which is performed when the parallel firing control is performed, and the target torque of the engine in the parallel firing control may be set to be equal to a target torque of the first motor in the independent motoring control performed without burning fuel in the engine That is, it is preferable that the target torque of the first motor in the motoring control performed while burning fuel in the engine is set at a value obtained by subtracting the target torque of the engine in the firing control from the target torque of the first motor in the motoring control performed without burning fuel in the engine.

The heating device may drive a fan using electric power of the battery so that the heat generated in the engine can be supplied into a cabin.

The regenerative control device may further comprise: a water temperature acquirer which is configured to acquire a temperature of cooling water of the engine, and the controller may perform the parallel motoring control and the parallel firing control simultaneously at least when the temperature of the cooling water acquired by the water temperature acquirer is not higher than a predetermined water temperature.

DETAILED DESCRIPTION OF EXEMPLARY EMBODIMENTS

A regenerative control device of a vehicle as an embodiment will be described below with reference to the drawings. The following embodiment is merely an exemplary one, which is not intended to exclude various modifications or technological applications that will not be described in the following embodiment. Each configuration of the embodiment can be carried out in various modifications without departing from the gist thereof and selected in accordance with necessity or combined suitably.

(1. Configuration of Device)

Figure 1:
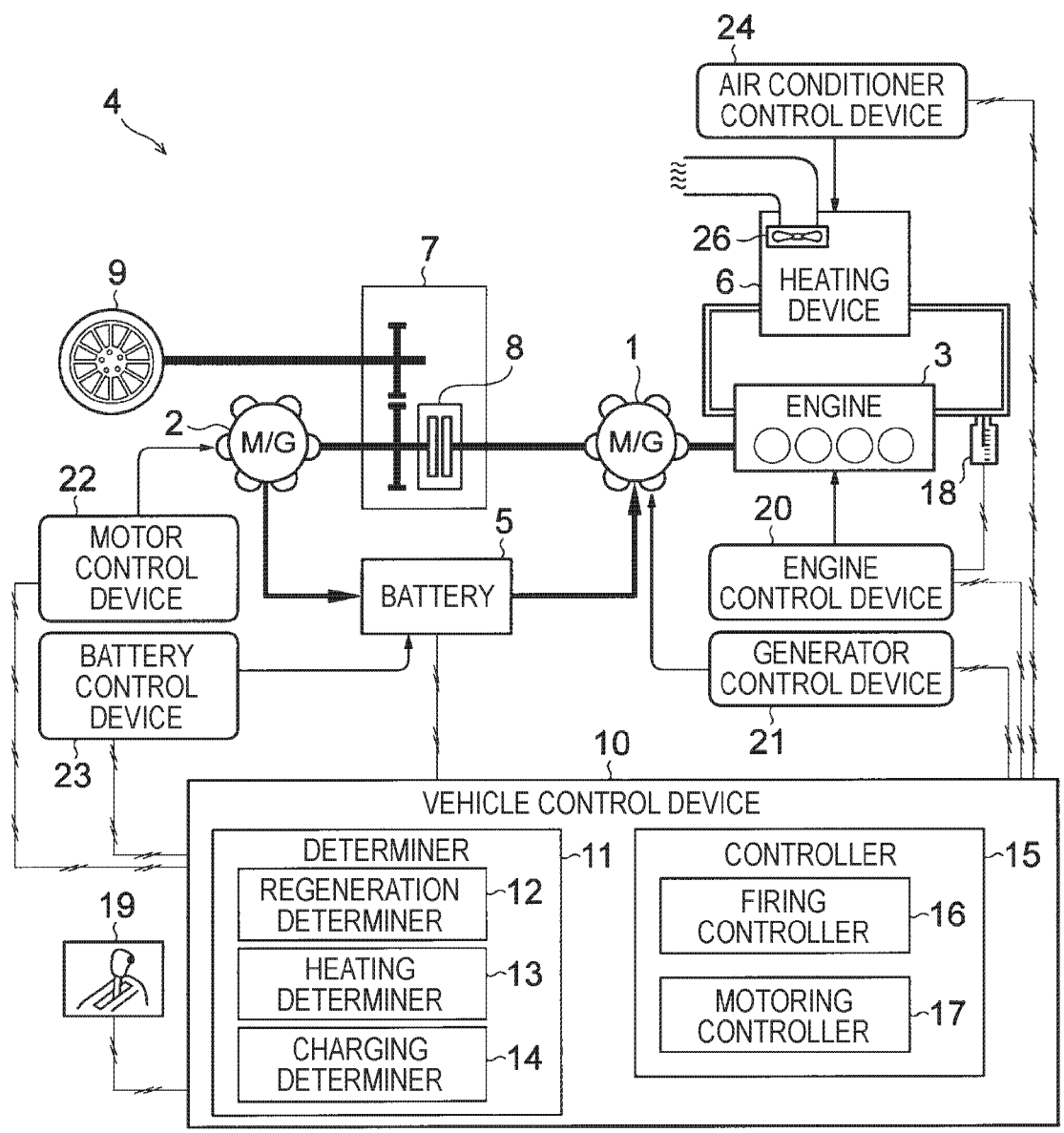
FIG. 1 is a schematic view showing a power train of a vehicle to which a regenerative control device according to an embodiment is applied by way of example.

A structure relating to a power train of a vehicle 4 to which a regenerative control device according to the embodiment is applied is shown in FIG. 1 by way of example. The vehicle 4 is a series/parallel combined hybrid vehicle, which is mounted with an engine 3 and a traveling motor 2 as driving sources. The engine 3 is an internal-combustion engine such as a gasoline engine or a diesel engine, in which fuel/air mixture containing fuel (gasoline, diesel oil, etc.) is burnt inside a combustion chamber to drive a rotation shaft. On the other hand, the traveling motor 2 is an AC motor generator (traveling motor generator) having a function as an electric motor and a function as a power generator. The engine 3 and the traveling motor 2 are connected in parallel to wheels 9 on a power transmission path extending to the wheels 9.

A transaxle 7 (transmission) is placed among the engine 3, the traveling motor 2 and the wheels 9. The transaxle 7 is a power transmission device in which a final drive (final reduction gear) including a differential gear (differential) is integrated with a transmission (gear box). The transaxle 7 includes a plurality of mechanisms serving for power transmission between a driving source and a driven device. The transaxle 7 internally has a large number of speed change mechanisms for changing a speed reduction ratio, and a clutch 8 for connecting or disconnecting the power transmission path between the engine 3 and the wheels 9. The disconnection/connection state of the clutch 8 is control led so that the engine 3 can be connected to the power transmission path or disconnected from the power transmission path.

A rotation shaft of a generator 1 is linked with the rotation shaft of the engine 3. The generator 1 is an AC motor generator (motor generator for power generation) having a function as a power generator for generating electric power using the driving force of the engine 3 and a function as an electric motor for starting the engine 3. In the following embodiment, the generator 1 will be referred to as motor 1 (first motor) simply under the consideration of the function of the generator 1 as an electric motor. On the other hand, the traveling motor 2 will be referred to as second motor 2.

The motor 1 and the second motor 2 are connected to a traveling battery 5. A not-shown inverter circuit is placed on a power supply circuit connecting the motor 1 and the second motor 2 with the battery 5. The inverter circuit is a transformer for mutually converting AC power on the motor 1 side and the second motor 2 side and DC power on the battery 5 side. The operation of the inverter is, for example, controlled to supply electric power of the battery 5 to the motor 1 and the second motor 2 individually. In the same manner, through the inverter, the battery 5 can be charged with electric power generated in each of the motor 1 and the second motor 2. Incidentally, the electric power generated in the second motor 2 will be also referred to as regenerative electric power.

An air conditioning system mounted on the vehicle 4 includes a heating device 6 and a not-shown cooling device. The heating device 6 has a function of generating hot air using heat generated in the engine 3 to thereby heat the inside of a cabin. For example, as shown in FIG. 1, coolant pipes (heating medium pipes) serving as flow channels of engine cooling water are arranged to pass through the inside of the heating device 6. When heating control is performed on the heating device 6, a fan 26 is rotationally driven by the electric power of the battery 5 so that the air heated by heat of the coolant pipes can be sent into the cabin.

A vehicle control device 10, an engine control device 20, a generator control device 21, a motor control device 22, a battery control device 23 and an air conditioner control device 24 shown in FIG. 1 are electronic control units mounted on the vehicle 4. For example, those units consist of LSI devices or built-in electronic devices including microprocessors such as CPUs (Central Processing Units) or MPUs (Micro Processing Units), ROMs (Read Only Memories), RAMs (Random Access Memories), auxiliary storage devices, interface devices, etc. integrated therein. Those electronic control devices 10 and 20 to 24 are connected to communication lines of a not-shown on-vehicle network so that they can make communication with one another.

The vehicle control device 10 performs comprehensive control and management all over the devices mounted on the vehicle 4. Here, the vehicle control device 10 grasps the operating state of each device belonging to the power train, the traveling state of the vehicle 4, etc. and controls the operating state of each device. The engine control device 20 performs specialized control as to the operating state of the engine 3. The generator control device 21 performs specialized control, as to the operating state of the motor 1 (generator). The motor control device 22 performs specialized control as to the operating state of the second motor 2 (traveling motor). In the same manner, the battery control device 23 performs specialized measurement and control as to the charge/discharge state, the charge rate, the deterioration rate, etc. of the battery 5, and the air conditioner control device 24 performs specialized control as to the operating state of the heating device 6.

(2. Summary of Control)

In the embodiment, detailed description will be made about two controls performed when regenerative electric power generated in the second motor 2 of the vehicle 4 cannot serve for charging the battery 5. That is, motoring control and firing control will be described. The two controls are performed in the vehicle control device 10 so that the engine 3 and the motor 1 can be driven through the engine control device 20 and the generator control device 21.

The motoring control is a control in which the electric power of the battery 5 is consumed by the motor 1 forcibly driving and rotating the engine 3 (motoring). In the motoring control, the vehicle control device 10 outputs a control signal to the generator control device 21, and the generator control device 21 operates the motor 1 in accordance with the control signal. On this occasion, a voltage, a current, an AC frequency, etc. to the motor 1 are adjusted to generate a motor target torque in the motor 1 as will be described later.

The firing control is a control in which fuel is supplied to the engine 3 for ignition or combustion (firing) so that the fuel can be burnt at least to keep the engine 3 generating heat. In the firing control, the vehicle control device 10 outputs a control signal to the engine control device 20, and the engine control device 20 operates the engine 3 in response to the control signal. On this occasion, a fuel injection amount, a fuel injection timing, an intake air amount, an ignition timing, etc. are adjusted to generate an engine target torque in the engine 3 as will be described later.

The aforementioned two controls, that is, the motoring control and the firing control are performed together (simultaneously and in parallel) during regenerative power generation when the heating device 6 is in operation and charging the battery 5 is regulated. That is, the motor 1 is rotated to keep urging the engine 3 while operation is performed to keep supplying fuel to the engine 3 and igniting (or combusting) the fuel therein. On this occasion, the magnitude of torque given to the engine 3 in the motoring control and the magnitude of torque given to the engine 3 in the firing control are controlled so that the total sum of the torques can reach magnitude enough to satisfy the self-rotation of the engine 3.

Here, description will be made about the magnitude of the torque given to the engine 3 by firing and the magnitude of the torque given to the engine 3 by motoring. As a related-art control manner to control start of the engine 3, there is a control manner in which torque is given to the engine 3 by use of a starter motor or the like, and giving the torque is suspended as soon as the engine 3 begins to rotate stably. There is also another control manner in which a fuel amount and an air amount are set to secure enough fuel concentration for the engine 3 to continue its self-rotation.

On the other hand, the motoring control in the embodiment is different from the related-art control manners at the point that torque is continuously given to the engine 3 from the motor 1 even after the engine 3 begins to rotate stably. In addition, the firing control in the embodiment is different from the related-art control manners at the point that a fuel amount and an air amount are set so that the engine 3 may be brought into an unstable state corresponding to a burning limit or less. Torque corresponding to fuel concentration with which the engine 3 can continue its self-rotation in the related-art control manners will be herein referred to as self-rotation torque. In the embodiment, the magnitude of torque given by firing and the magnitude of torque given by motoring are controlled so that the total sum of the two torques is equal to the magnitude of she self-rotation torque (idling torque).

The conditions with which the motoring control and the firing control can be performed are set based on the state of regenerative power generation in the second motor 2, the state of the battery 5 and the operating state of the heating device 6. Information relating so the control conditions is acquired from the motor control device 22, the battery control device 23 and the air conditioner control device 24. In addition thereto, considering information about the temperature of engine cooling water detected by a water temperature sensor 13 (water temperature acquirer) and the operating position of a gear lever (select lever, shift lever, etc.) detected by a shift position sensor 19, the vehicle control device 10 according to the embodiment determines success or failure as to the conditions with which the motoring control and the firing control can be performed.

Incidentally, as to the motoring control and the firing control, the vehicle control device 10 may also perform independent firing control for performing only firing in the engine 3 or independent motoring control for performing only motoring in the motor 1 without burning fuel in the engine 3 The conditions with which the independent motoring control or the independent firing control can be performed are also set based on the state of regenerative power generation in the second motor 2, the state of the battery 5 and the operating state of the heating device 6. For example, the independent firing control is performed during heating when the second motor 2 does not perform regenerative power generation. On the other hand, the independent motoring control is performed during regenerative power generation when the heating device 6 is not in operation.

Here, the names of the controls in the embodiment will be described. The independent motoring control is one of motoring control manners, in which motoring is performed without burning fuel in the engine 3. In the same manner, the independent firing control is one of firing control manners, in which firing is performed without using the driving force of the motor 1. The independent motoring control belongs to motoring control in a broad sense (or control performing at least motoring). In the same manner, the independent, firing control belongs to firing control in a broad sense (or control performing at least firing).

That is, in the embodiment, motoring control in a broad sense is classified, into two types depending on presence/absence of burning in the engine 3. One of the two types in which motoring is performed while burning fuel is referred to as parallel motoring control, and the other type in which motoring is performed without burning fuel is referred to as independent motoring control. In the same manner, in the embodiment, firing control in a broad sense is classified into two types depending on presence/absence of a driving force of the motor 1. One of the two types in which firing is performed while using the driving force of the motor 1 is referred to as parallel firing control, and the other type in which firing is performed without using the driving force of the motor 1 is referred to as independent firing control.

Conceptual inclusive relations among these controls can be summarized, as the following Table 1. The parallel motoring control in the embodiment can be performed together with the parallel firing control. On the other hand, the independent motoring control in the embodiment is not performed together with the independent firing control or the parallel firing control. Likewise, the independent firing control in the embodiment is not performed together with the independent motoring control or the parallel motoring control.

TABLE 1

|  | Name of control in embodiment | Burning of fuel | Motor driving force |
|---|---|---|---|
| Motoring control in broad sense | Parallel motoring control | ○ | ○ |
|  | Independent motoring control | x | ○ |
| Firing control in broad sense | Parallel firing control | ○ | ○ |
|  | Independent firing control | ○ | x |

(3. Functions)

In the vehicle control device 10, a determiner 11 and a controller 15 are provided as functional elements for carrying out the aforementioned various controls. These elements may be implemented by electronic circuits (hardware) or may be programmed as software recorded and saved in a ROM or an auxiliary storage device of the vehicle control device 10. Alternatively, parts of the functions may be provided as hardware while the other parts are provided as software.

As shown in FIG. 1, a regeneration determiner 12, a heating determiner 13 and a charging determiner 14 are provided in the determiner 11. In the respective determiners 12 to 14, the conditions with which the four controls can be performed are determined. On the other hand, in the controller 15, a firing controller 16 and a motoring controller 17 are provided. When the conditions with which the firing control, the independent firing control, the motoring control and the independent motoring control can be performed are established, the respective controllers 16 and 17 output control, signals respectively corresponding to those controls to the engine control device 20 and the generator control device 21 to operate the motor 1 and the engine 3.

(3-1. Determiners)

The regeneration determiner 12 determines the state of regenerative power generation in the second motor 2. Here, whether regenerative power generation can be performed in the second motor 2 or not is determined based on information transmitted from the motor control device 22 as to the operating state of the second motor 2. Specifically, the determination is made based on the current value and the voltage value in the second motor 2, the stepping amount of an accelerator pedal, the stepping amount of a brake pedal, the operating state of a gear lever, etc.

For example, when the operating position of the gear lever is a low-speed gear stage (gear stage high in gear ratio) such as "first gear stage" or "B stage (gear stage where regenerative braking is effectuated strongly)" or when shift-down operation is performed, the accelerator pedal is not stepped down but the second motor 2 is rotating inertially. In such a case, it is concluded that regenerative power generation can be performed. On the other hand, when the accelerator pedal is stepped down or when the operating position of the gear lever is "fourth gear stage" or "D stage (gear stage set in a general traveling state)", regenerative braking force is regarded as unnecessary. That is, it is determined here whether to allow the second motor 2 to perform regenerative power generation or not. The result of the determination here is transmitted to the controller 15.

The heating determiner 13 determines whether the heating device 6 is in operation or not. Here, whether the heating device 6 is in operation or not is determined based on information transmitted from the air conditioner control device 24 as to the operating state of the heating device 6. Preferably it is determined whether heat generated in the engine 3 is in use for heating or not. For example, if a set temperature is not so high even when the heating device 6 is in operation, it can be considered that the engine 3 does not have to generate heat. In such a case, even when the heating device 6 is in operation, it may be concluded that heat generated in the engine 3 is not in use for heating.

In addition to the aforementioned determination conditions, the heating determiner 13 determines whether the temperature of engine cooling water detected by the water temperature sensor 18 is at most a predetermined water temperature or not. Thus, it is determined whether the heating device 6 is in operation or not. For example, when the temperature of the engine cooling water is not higher than the predetermined water temperature, it is judged that the engine 3 had better generate heat, and it is concluded that the heating device 6 is in operation. On the contrary, when the temperature of the engine cooling water exceeds the predetermined water temperature, the engine 3 does not have to generate heat. Thus, it is concluded that the heating device 6 is not in operation. The result of the determination here is transmitted to the controller 15.

The charging determiner 14 determines whether charging the battery 5 is regulated or not Here, whether the battery 5 may be charged or not is determined based on the charge rate, the cell temperature, the deteriorate, etc. in the battery 5. For example, when the charge rate of the battery 5 is close to a full charge state, it is concluded that charging the battery 5 is regulated in order to avoid overcharging. In addition, when the battery cell temperature is an extremely low temperature, deterioration may be accelerated by charging the battery 5. It is therefore concluded that charging is regulated. The result of the determination here is transmitted to the controller 15.

(3-2. Firing Controller)

The firing controller 16 performs the firing control in a broad sense. The parallel firing control is performed when all the following conditions X, Y and Z are established. On the other hand, the independent firing control is performed when the following condition X is established but at least one of the conditions Y and Z is not established. Therefore, the condition. X is shared between the parallel firing control and the independent firing control.

Condition X. The heating device 6 is in operation.
Condition Y. The second motor 2 can perform regenerative power generation.
Condition Z. Charging the battery 5 is regulated.

When the conditions with which the independent firing control can be performed are established, the firing controller 16 sets an engine target torque based on the operating state of the heating device 6. The engine target torque is set at magnitude not lower than torque (idling torque) required for keeping idling in the engine 3. For example, the engine target torque is set in accordance with a set temperature of heating, a temperature inside a cabin, an outdoor temperature, etc. On the other hand, when the conditions with which the firing control can be performed are established, the firing controller 16 sets the engine target torque to be equal to or lower than burning limit torque, namely, sets the engine target torque at magnitude as high as the burning limit torque, or lower than the burning limit torque. In the embodiment, assume that the engine target torque is set at magnitude as high as the burning limit torque.

In addition, the firing controller 16 sets the fuel injection amount, the fuel injection timing, the intake air amount (throttle opening degree), the ignition timing, etc. in the engine 3 so that the engine target torque set, thus can be generated in the engine 3. The firing controller 16 transmits, to the engine control device 20, a control signal including those settings. Thus, the engine control device 20 can operate engine 3 in a burning limit state. Incidentally, the firing controller 16 in the embodiment al so has a function of transmitting, to the air conditioner control device 24, a control signal for driving the fan 26 of the heating device 6 using the electric power of the battery 5. Due to this control, the electric power consumption of the battery 5 is accelerated to make it easy to release the battery 5 from regulation of charging.

The burning limit torque means torque generated by burning at the burning limit (minimum concentration limit in which mixture of fuel and air can burn). For example, when the target torque of the engine 3 is set at magnitude as high as the burning limit torque, fuel and air are introduced into the engine 3 by amounts capable of barely keeping its self-rotation. Therefore, when either the amount of fuel or the amount of air is reduced or when a load is increased, the engine 3 cannot keep its self-rotation but the engine 3 stalls (stops).

Thus, the burning limit torque is a minimum torque with which the engine 3 can keep its self-rotation under no load. The burning limit torque includes a no-load torque corresponding to a load loss (internal loss) of the engine 3, such as a mechanical friction loss, an intake/exhaust loss, a cooling loss, etc. On the other hand, the burning limit torque does not include an external load torque corresponding to a load (external load) of external devices outside the engine 3, such as an air conditioning load, a transmission load, an accessory load, etc. Incidentally, engine target torque (idling torque to keep independent idling rotation in the engine 3) set in the independent firing control includes both the no-load torque and the external load torque. Therefore, the burning limit torque has a value smaller than the idling torque.

(3-3. Motoring Controller)

The motoring controller 17 performs the motoring control in a broad sense. The parallel motoring control is performed when all the conditions X, Y and Z are established, in the same manner as the parallel, firing control. On the other hand, the independent motoring control is performed when only the condition X is not established but both the conditions Y and Z are established. Therefore, the conditions Y and Z are shared between the parallel motoring control and the independent motoring control.

When the conditions with which the independent motoring control can be performed are established, the motoring controller 17 sets a motor target torque based on the magnitude of regenerative electric power the second motor 2 can generate, the rotation speed of the second motor 2 (the traveling speed of the vehicle 4), the charging state of the battery 5, the braking force (regenerative braking force) intended to be given to the wheels 9, etc. The value of the regenerative electric power is calculated, for example, based on the rotation speed of the second motor 2 (the traveling speed of the vehicle 4), the current, the voltage and the AC frequency in the second motor 2, etc. Further, when charging the battery 5 can he performed, the motor target torque may be set based on surplus electric power obtained by subtracting the electric power for charging the battery 5 from the aforementioned regenerative electric power.

On the other hand, when the conditions with which the motoring control can be performed are established, the motoring controller 17 subtracts the engine target torque in the firing control from the motor target torque in the independent motoring control, and sets the obtained value as a motor target torque in the motoring control. That is, the target torque in the motoring control and the target torque in the firing control are set to make the total sum of the two target torques equivalent between when the independent motoring control is performed and when the motoring control and the firing control are performed together.

In addition, the motoring controller 17 sets the voltage, the current, the AC frequency, etc. in the motor 1 so that the motor target torque described above can be outputted from the motor 1. The motoring controller 17 transmits, to the generator control device 21, a control signal including those settings. Thus, the generator control device 21 can operate the motor 1.

The correspondence relations between the aforementioned control, conditions and the aforementioned control contents will be summarized in the following Table 2. Each circle symbol in the table means that the condition corresponding to the circle symbol is established. The conditions with which the firing control can be performed is the same as the conditions with which the motoring control can be performed. Therefore, the firing control and the motoring control are performed simultaneously and in parallel.

TABLE 2

|  | Condition X: heating device in operation | Condition Y: regeneration in second motor | Condition Z: charging battery regulated |
|---|---|---|---|
| Parallel firing control and Parallel motoring control | o | o | o |
| Independent firing control — without regenerative charging |  | x | x |
|  |  | x | o |
| Independent firing control — with normal regenerative charging |  | o | x |
| Independent motoring control | x | o | o |
| Motor and engine not controlled — without regenerative charging |  | x | x |
|  |  | x | o |
| Motor and engine not controlled — with normal regenerative charging |  | o | x |

(4. Flow Chart)

Figure 2:
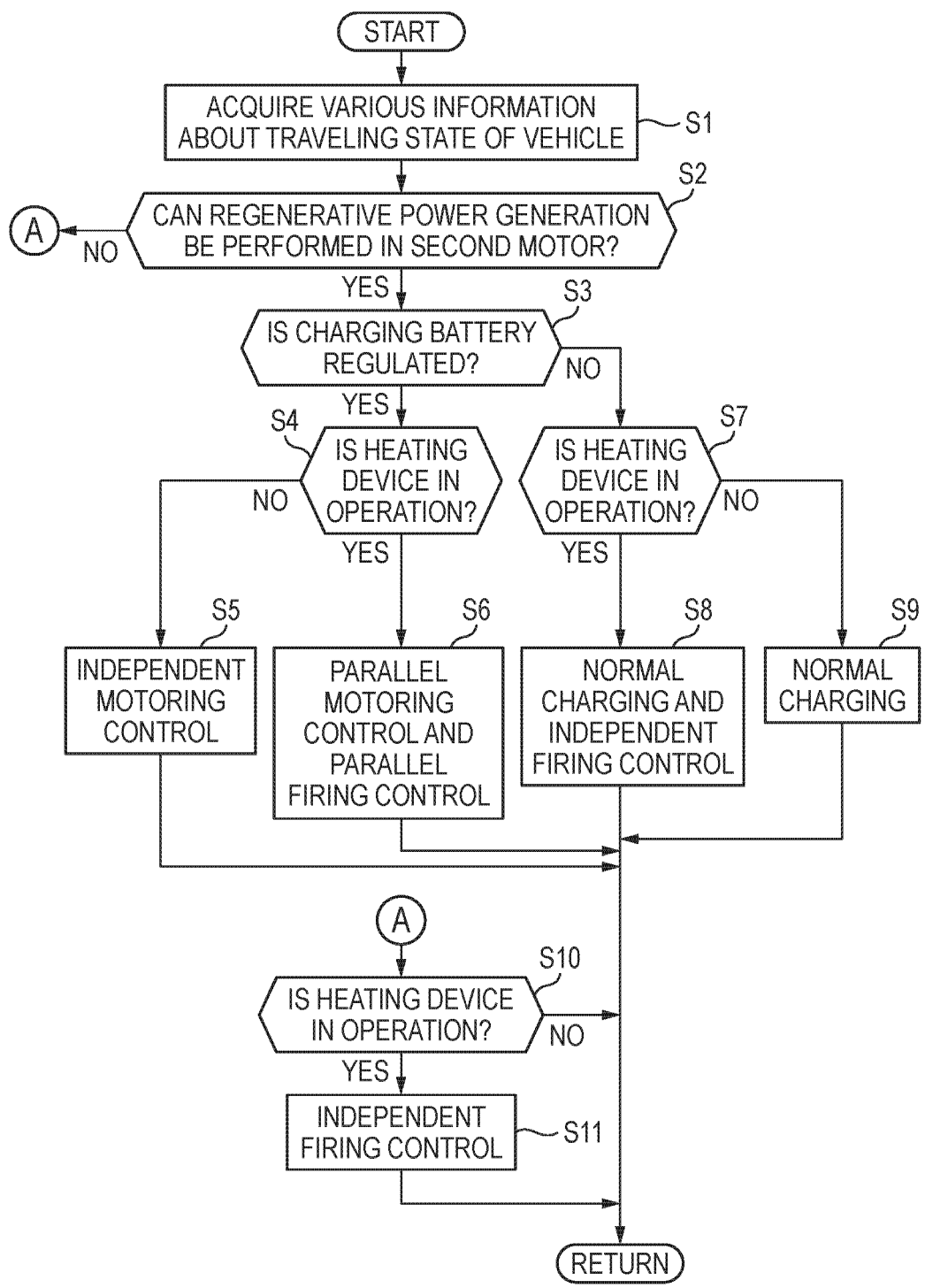
FIG. 2 is a flow chart for explaining the contents of control in the regenerative control device.

FIG. 2 is a flow chart showing the aforementioned control procedure by way of example. This flow is executed repeatedly in a predetermined cycle within the vehicle control device 10. In Step S1, various pieces of information about the aforementioned controls are acquired. For example information about the operating state of the second motor 2 is transmitted from the motor control device 22, and information about the operating position of the gear lever is inputted from the shift position sensor 19. In addition, information about the operating state of the heating device 6 is transmitted from the air conditioner control device 24, and information about the temperature of engine cooling water is inputted from the water temperature sensor 13. Further, information about the state of the battery 5 is transmitted from the battery control device 23.

In Step S2, the regeneration determiner 12 determines whether the second motor 2 can perform regenerative power generation or not. For example, when the operating position of the gear lever is a position of "B" and electric power generated in the second motor 2 can be recovered by the kinetic energy of the wheels 9, it is concluded that regenerative power generation can be performed, and the routine of processing advances to Step S3. On the contrary, when regenerative power generation cannot be performed, the routine of processing advances to Step S10. The contents of the determination in Step S2 corresponds to the aforementioned condition Y.

In Step S3, the charging determiner 14 determines whether charging the battery 5 is regulated or not. For example, when she charge rate of the battery 5 reaches at least a predetermined charge rate close to full charge or when the cell temperature of the battery 5 is out of a predetermined temperature range, it is concluded that charging the battery 5 is regulated, and the routine of processing advances to Step S4. On the contrary, when charging the battery 5 is not regulated, the routine of processing advances to Step S7. The contents of the determination in Step S3 corresponds to the aforementioned condition Z.

In Step S4, the heating determiner 13 determines whether the heating device 6 is in operation or not. For example, when a power switch of the heating device 6 is operated ON and the temperature of the engine cooling water is lower than a predetermined temperature, it is concluded that the heating device 6 is in operation, and the routine of processing advances to Step S6. On the contrary, when the heating device 6 is not in operation, the routine of processing advances to Step S5. The contents of the determination in Step S4 corresponds to the aforementioned condition X.

In Step S5, the independent motoring control is performed by the motoring controller 17 because the aforementioned condition X is not established but the conditions Y and Z are established. On this occasion, the motor target torque in the independent motoring control is set, for example, based on the regenerative electric power or the rotation speed (the traveling speed of the vehicle 4) in the second motor 2, the charging state of the battery 5, the intended regenerative braking force, etc. Thus, as the regenerative electric power increases, the motor 1 is driven at a higher speed to consume a larger amount of electric power. Accordingly, suitable magnitude of a regenerative braking force is generated even when the battery 5 cannot be charged at all.

On the other hand, in the case where the routine of processing advances to Step S6, all the aforementioned conditions X, Y and Z are established. Therefore, the firing control is performed by the firing controller 16 and the motoring control is performed by the motoring controller 17 simultaneously and in parallel. On this occasion, the engine target torque in the firing control is set to be equal to the burning limit torque. On the other hand, the motor target torque in the motoring control is set at a value obtained by subtracting the engine target torque from the motor target torque in the independent motoring control.

That is, the total torque obtained by summing the motor target torque and the engine target torque becomes equal to the motor target torque in the case where the routine of processing advances to Step S5. Accordingly, even when the heating device 6 begins to operate during execution of the independent motoring control, the rotating state of the engine 3 is not changed but the rotation stability is improved. In addition, the motor 1 is driven to consume the regenerative electric power. Accordingly, even when the battery 5 cannot be charged at all, suitable magnitude of a regenerative braking force is generated. Incidentally, on this occasion, a control signal is outputted from the firing controller 16 to the air conditioner control device 24 so that the fan 26 of the heating device 6 can be rotationally driven by the electric power of the battery 5. Thus, the power consumption of the battery 5 can be accelerated.

In the case where the routine of processing advances from Step S3 to Step S7, the heating determiner 13 determines whether the heating device 6 is in operation or not. When it is concluded that the heating device 6 is in operation, the routine of processing advances to Step S8. When not, the routine of processing advances to Step S9.

In Step S8, the aforementioned conditions X and Y are established but the condition Z is not established. Therefore, the independent firing control is performed by the firing controller 16, and the battery 5 is charged (normally charged) with regenerative electric power. The engine target torque in the independent firing control is, for example, set at magnitude not lower than the idling torque required for keeping idling in the engine 3. Thus, the rotating state of the engine 3 is stabilized, and the temperature of the engine cooling water increases to improve the heating performance.

The electric power with which the battery 5 is charged by the regenerative electric power is calculated, for example, based on the regenerative electric power generated in the second motor 2, the charging state of the battery 5, the braking force (regenerative braking force) intended to be given to the wheels 9, etc. Incidentally, in the case where the routine of processing advances to Step S9, only the aforementioned condition Y is established but the conditions X and Z are not established. The motor 1 and the engine 3 are not controlled especially, but only normal charging is performed. Charging electric power in this case is also calculated, for example, based on the regenerative electric power generated in the second motor 2, the charging state of the battery 5, the braking force (regenerative braking force) intended to be given to the wheels 9, etc.

In the case where the routine of processing advances from Step S2 to Step S10, the heating determiner 13 determines whether the heating device 6 is in operation or not. When it is concluded that the heating device 6 is in operation, the routine of processing advances to Step S11. In Step S11, the aforementioned condition X is established but the condition is not established. Therefore, the independent firing control is performed by the firing controller 16. In the independent firing control, similar control to the independent firing control in Step S8 is performed.

(5. Operations and Effects)

(1) The aforementioned vehicle control device 10 is provided with the determiner 11 for determining the operating state of the heating device 6 and the state in which charging the battery 5 is regulated. In addition, the vehicle control device 10 is provided with the controller 15 for performing motoring control on the motor 1 and firing control on the engine 3 simultaneously during regenerative power generation when the heating device 6 is in operation and charging is restricted. Those control configurations contribute to heating the engine 3 while the electric power generated by she regenerative power generation is consumed in the motor 1. Thus, even when the battery 5 cannot be charged, it is possible to increase the temperature of engine cooling water while securing a regenerative braking force. It is therefore possible to improve the heating performance. It is therefore possible to improve both the regenerative braking performance and the heating performance. Further, the engine target torque set in the firing control is set based on the burning limit torque. It is therefore also possible so secure stability in rotation of the engine 3.

(2) In the firing controller 16 in the vehicle control device 10, the engine target torque set in the firing control is set to be equal to the burning limit torque. Due to this setting, it is possible to secure minimum rotation stability. That is, even if some factor makes the motoring control so unstable motor torque given so the engine 3 decreases or disappears, the fuel injection amount and the intake air amount corresponding to the burning limit torque can be secured. It is therefore possible to avoid an event (engine stop) in which the engine 3 is stopped suddenly. In addition, the burning limit torque is smaller than the idling torque. Therefore, when torque corresponding to the difference between them is added by the motor 1, at least the motor target torque corresponding to the difference can be secured so that electric power consumption (that is, regenerative braking force) in the motor 1 can be secured. In this manner, it is possible to make the heating performance and the regenerative braking performance compatible while securing the stability in rotation of the engine 3.

(3) Incidentally, the magnitude of the engine target torque set in the firing control may be set at magnitude lower than the burning limit torque. In this case, it is possible to reduce the fuel injection amount or the intake air amount, for example, as compared with the case where the magnitude of the engine target torque is set to be substantially equal to that of the idling torque. In addition, the motoring control is performed together when the firing control is performed. It is therefore possible to continue to assist the rotating state of the engine 3 using the motor 1. Accordingly, when motor torque corresponding to the decrease in the engine target torque is added, it is possible so keep she stability in rotation of the engine 3.

(4) In the aforementioned vehicle control device 10, control is made to make the magnitude of the total value of torques given to the engine 3 by the motoring control and the firing control equal to that of torque given to the engine 3 by the independent motoring control, which is a motoring control without burning fuel in the engine 3. Due to the control made thus, the torque given to the engine 3 can be kept constant even when the operating state of the heating device 6 fluctuates. It is therefore possible to improve the stability in rotation of the engine 3 while it is possible to suppress occurrence of noise and vibration. This point will be described with reference to FIG. 3A and FIG. 3B.

Figure 3A:
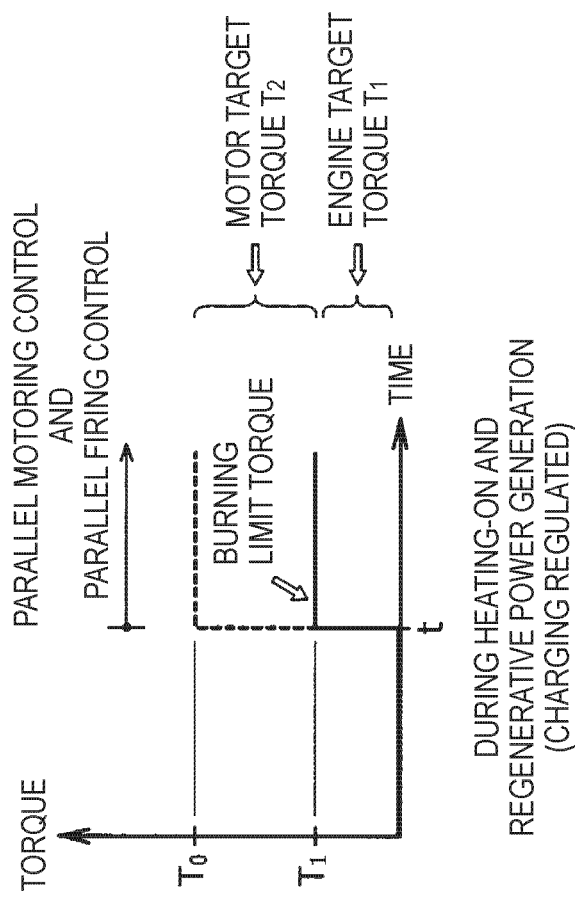
FIGS. 3A and 3B are graphs for explaining control actions in the regenerative control device, FIG. 3A showing a motor target torque in independent motoring control during non-heating (heating OFF) and regenerative power generation, FIG. 3B showing an engine target torque in firing control and a motor target torque in motoring control during heating (heating ON) and regenerative power generation.
Figure 3B:
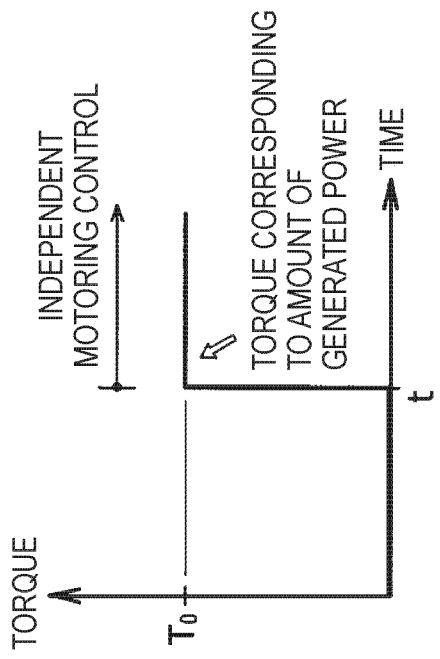

In the case where the aforementioned conditions Y and Z are established together, the independent motoring control is performed when the condition X is not established, and both the motoring control and the firing control are performed when the condition X is established. FIG. 3A is a graph showing a motor target torque $T_0$ in the former state, and FIG. 3B is a graph showing the total value of an engine target torque $T_1$ and a motor target torque $T_2$ in the latter state. Time t in each graph shows the moment when, for example, the condition Y is changed from a not-established state to an established state.

In the independent motoring control, the motor target torque $T_0$ is set based on the regenerative electric power the second motor 2 can generate, the rotation speed of the second motor 2 (the traveling speed of the vehicle 4), the charging state of the battery 5, the intended regenerative braking force, etc. The motor target torque $T_0$ has magnitude corresponding to the amount of electric power generated in the second motor 2.

On the other hand, in the firing control, the engine target torque $T_1$ is set to be equal to the burning limit torque. In addition, in the motoring control performed simultaneously with the firing control, the motor target torque $T_2$ is set at magnitude obtained by subtracting the engine target torque $T_1$ from the motor target torque $T_0$ ($T_2=T_0-T_1$). That is, the magnitude of the total value of the engine target torque $T_1$ and the motor target torque $T_2$ is equal to the magnitude of the motor target torque $T_0$ set in the case where the condition X is not established. As a result, the rotating state of the engine 3 is not affected by success or failure of the condition X. Thus, the stability in rotation of the engine 3 is improved.

(5) For the firing control in the vehicle control device 10, a control signal for driving the fan 26 of the heating device 6 using the electric power of the battery 5 is transmitted to the air conditioner control device 24. As a result, the power consumption of the battery 5 can be accelerated so that the electric power consumption of the battery 5 can be accelerated to make it easy to release the battery 5 from regulation of charging, while the effect of preventing the battery 5 from being charged can be enhanced. When the battery 5 is released from regulation of charging, normal charging and the independent firing control are carried out. Thus, the reduced charge rate of the battery 5 can be recovered by regenerative power generation that will be performed after that.

(6) In the vehicle control device 10, the operating state of the heating device 6 is determined with reference to the temperature of engine cooling water. In addition, the motoring control and the firing control are performed when the temperature of engine cooling water is not higher than a predetermined water temperature. It is therefore possible to secure heating performance when the engine 3 has been cooled. On the other hand, when the temperature of the engine cooling water is increased sufficiently, those controls are not performed. Thus, the fuel consumption can be suppressed.

(6. Modifications)

In spite of the aforementioned constituents of the embodiment, various modifications can he made thereon without departing from the gist thereof. Respective constituents of the embodiment maybe selected in accordance with necessity or suitably combined. For example, in the aforementioned Table 2, specific control contents other than the case where all the conditions X, Y and Z are established may be changed suitably. That is, respective control conditions for the independent firing control, the independent motoring control and the normal charging are not limited to the control conditions described in the aforementioned embodiment.

In addition, the aforementioned embodiment was described in detail along the case where the engine target torque in the firing control is set at magnitude as high as the burning limit torque. However, the engine target torque may be set at magnitude lower than the burning limit torque. In this case, when the magnitude of torque added by the motor 1 is set to be slightly larger, a similar effect to that in the aforementioned embodiment can be obtained. Incidentally, in order to secure stability in rotation of the engine 3, it is preferable that the total value of the engine target torque in the firing control and the motor target torque in the motoring control is made not lower than the idling torque. However, the total value may be set at magnitude lower than the idling torque (for example, the total value is set to be as high as the burning limit torque).

In addition, in the motoring control in the aforementioned embodiment, control is made to forcibly drive and rotate the engine 3 using the motor 1. However, the specific manner for driving the engine 3 in the motoring control is not limited thereto. For example, an electric motor and/or a starter motor other than the motor 1 may be used to make control to rotationally drive the engine 3. In this case, the total value of torques given to the engine 3 may be dealt with as one corresponding to the "motor target torque" in the aforementioned embodiment.

According to an aspect of the present invention, motoring control and firing control are performed together so that an engine can be warmed up while electric power generated by regenerative power generation is consumed by a generator. As a result, it is possible to increase the temperature of engine cooling water while securing a regenerative braking force, and it is possible to improve heating performance. In addition, since the target torque of the engine is set based on burning limit torque, it is possible to improve not only the regenerative braking force and the heating performance but also stability in rotation of the engine.

What is claimed is:

1. A regenerative control device of a vehicle, the vehicle including: an on-vehicle engine; a first motor which is connected to the engine; a second motor which is configured to drive wheels and which is configured to perform regenerative power generation; a battery which is connected to the first motor and the second motor; and a heating device which is configured to heat using heat generated in the engine, the regenerative control device comprising:
   a determiner which is configured to determine whether the heating device in operation or not, and which is configured so determine whether charging the battery is regulated or not; and
   a controller which is configured to perform parallel firing control in which a driving force is given to the engine by the first motor while burning fuel in the engine, during the regenerative power generation when the heating device is in operation and charging the battery is regulated,
   the controller which is configured to set a target torque of the engine in the parallel firing control to be equal to or lower than a burning limit torque of the engine.

2. The regenerative control device according to claim 1, wherein
   the controller performs independent motoring control in which a driving force is given to the engine by the first motor without burning fuel in the engine, during the regenerative power generation when the heating device is not in operation and charging the battery is regulated, and
   a total sum of a target torque of the first motor in parallel motoring control which is performed when the parallel firing control is performed, and the target torque of the engine in the parallel firing control is set to be equal to a target torque of the first motor in the independent motoring control performed without burning fuel in the engine.

3. The regenerative control device according to claim 1, wherein
   the heating device drives a fan using electric power of the battery so that the heat generated in the engine can be supplied into a cabin.

4. The regenerative control device according to claim 1, further comprising:
   a water temperature acquirer which is configured to acquire a temperature of cooling water of the engine, wherein
   the controller performs parallel motoring control and the parallel firing control simultaneously at least when the temperature of the cooling water acquired by the water temperature acquirer is not higher than a predetermined water temperature.

5. The regenerative control device according to claim 2, further comprising:
   a water temperature acquirer which is configured to acquire a temperature of cooling water of the engine, wherein
   the controller performs the parallel motoring control and the parallel firing control simultaneously at least when the temperature of the cooling water acquired by the water temperature acquirer is not higher than a predetermined water temperature.

6. The regenerative control device according to claim 3, further comprising:
   a water temperature acquirer which is configured to acquire a temperature of cooling water of the engine, wherein
   the controller performs parallel motoring control and the parallel firing control simultaneously at least when the temperature of the cooling water acquired by the water temperature acquirer is not higher than a predetermined water temperature.

* * * * *